United States Patent [19]

Nikaido

[11] Patent Number: 5,140,450
[45] Date of Patent: Aug. 18, 1992

[54] TRANSPARENT ELECTRO-CONDUCTIVE FILM AND LIQUID CRYSTAL DISPLAY USING THE SAME

[75] Inventor: Masaru Nikaido, Miura, Japan

[73] Assignee: Kabushiki Kaisha Toshiba, Kawasaki, Japan

[21] Appl. No.: 501,788

[22] Filed: Mar. 28, 1990

[30] Foreign Application Priority Data

Mar. 31, 1989 [JP] Japan .................. 1-81954

[51] Int. Cl.$^5$ .............................................. G02F 1/13
[52] U.S. Cl. ........................................ 359/82; 359/62; 428/1; 428/447
[58] Field of Search ............... 350/334, 339 R, 341; 428/1, 447, 448, 516; 359/62, 82, 83; 430/20; 313/500, 506

[56] References Cited

U.S. PATENT DOCUMENTS

| | | | |
|---|---|---|---|
| 4,561,725 | 12/1985 | Hotta | 350/341 |
| 4,708,914 | 11/1987 | Kamijo | 350/339 R |
| 4,766,048 | 8/1988 | Hisamura | 430/58 |
| 4,769,418 | 9/1988 | Mizuno et al. | 525/106 |
| 4,775,964 | 10/1988 | Alessio et al. | 362/23 |
| 4,824,882 | 4/1989 | Nakamura et al. | 350/349 |
| 4,948,690 | 8/1990 | Hisamura et al. | 430/60 |
| 4,966,933 | 10/1990 | Kawakami et al. | 524/310 |

FOREIGN PATENT DOCUMENTS

| | | | |
|---|---|---|---|
| 62-172031 | 7/1987 | Japan | 525/106 |
| 62-220772 | 9/1987 | Japan | 350/334 |
| 62-232448 | 10/1987 | Japan | 350/334 |
| 62-233248 | 10/1987 | Japan | 525/106 |
| 63-127227 | 5/1988 | Japan | 350/334 |
| 1-45631 | 2/1989 | Japan | 350/334 |
| 2-205822 | 8/1990 | Japan | 359/62 |
| 2-216125 | 8/1990 | Japan | 359/82 |
| 2-217821 | 8/1990 | Japan | 359/82 |
| 2-242222 | 9/1990 | Japan | 359/62 |
| 2-259726 | 10/1990 | Japan | 359/82 |

OTHER PUBLICATIONS

Database Derwent World Patent Index, AN= 85-287405, Derwent Publications Ltd., London, GB; & JP-A-60 198 519 (Sharp K.K.) Aug. 10, 1985.

*Primary Examiner*—Rolf Hille
*Assistant Examiner*—Minhloan Tran
*Attorney, Agent, or Firm*—Oblon, Spivak, McClelland, Maier & Neustadt

[57] ABSTRACT

The present invention relates to a transparent electro-conductive film comprising an optical transparent polymer film and a transparent electro-conductive thin film formed on at least one principal surface of the above polymer film. The polymer film contains 1 to 20% by weight of hydrophobic resin particles such as infusible silicone resin particles having an average particle diameter of 0.5 to 10 μm. The hydrophobic resin particles improve moisture permeability and suppress water permeation of the transparent electro-conductive film without any adverse effects on properties such as transparency. Also, a AC powder type EL panel and a liquid crystal display of the present invention have the above transparent electro-conductive films as a transparent electrode and a base thereof. Therefore, lower cost is achieved and a life is made longer.

11 Claims, 5 Drawing Sheets

REJECT RATE OF DEFECTIVE APPEARANCE BY HIGH TEMPERATURE AND HUMIDITY TEST AT 50°C AND 90%

TRANSPARENT ELECTRO-CONDUCTIVE FILM AND LIQUID CRYSTAL DISPLAY USING THE SAME

FIELD OF THE INVENTION AND RELATED ART STATEMENT

The present invention relates to a transparent electro-conductive film, having moisture impermeability and transparency and being useful for an electrode of a display requiring moisture resistance, and a AC powder type electroluminescent panel (hereinafter called EL panel) and a liquid crystal display comprising the transparent electro-conductive films mentioned above.

A thin film having transparency to visible rays and conductivity formed on a polymer film has been known as a transparent electro-conductive film. As the above transparent electro-conductive thin film, for example, tin oxide, indium oxide or indium tin oxide (hereinafter called I. T. O.) is used. As the transparent polymer film, for example, a polymer film comprising polyethylene terephthalate (hereinafter called PET) or polyether sulfone (hereinafter called PES) is used. These transparent electro-conductive films have various characteristics such as thin, light, unbreakable, flexible, processable and broadly formable which a conductive transparent glass comprising a transparent electro-conductive thin film formed on a transparent glass base does not have.

Because of the above characteristics, the transparent electro-conductive transparent film has been used extensively for an illuminant of a lighting, a display component, an electrode of a light flexible display, for example, a AC powder type EL panel used for a helper illuminate such as a back light of a liquid crystal display and a liquid crystal display comprising a polymer film as a base (hereinafter called PF- LCD).

For example, a AC powder type EL panel comprising the above transparent electro-conductive film has the following construction.

An emitting layer comprising an organic dielectric binder in which phosphor particles and organic fluorescent pigments are dispersed is coated on a back electrode. A insulating layer dispersed a fine inorganic dielectric particles in an organic dielectric binder is often inserted between an emitting layer and a back electorial. As a counter electrode, a transparent electro-conductive film comprising a polymer film having a transparent electrode contacting with the emitting layer is layered on the emitting layer opposite to the insulating layer.

On the other hand, the above AC powder type EL panel has a drawback that emitting characteristics remarkably lower because the organic dielectric binder and the phosphor particles are heavily degraded by moisture absorption. Therefore as a polymer film used for the transparent electro-conductive film, general AC powder type EL panels employ PET among various polymer films, which is superior to other kinds of polymer films in transparency, solvent resistance, moisture impermeability and dimensional stability. However, because only using PET film as a base of the transparent electro-conductive film can not provide required moisture proofness, a desiccant film comprising nylon 6 etc. and a moistureproof package film mainly comprising, for example, trifluorochloroethylene are respectively laminated on outer side of the transparent electro-conductive film and outer side of the back electrode.

This is double moistureproof system which prevents water penetration by the moistureproof package film comprising trifluorochloroethylene which has water resistance higher than other various polymer films and absorbs a little water penetrating through the moistureproof package film before it contacts with the emitting layer through the transparent electro-conductive film by the desiccant film within the moistureproof package film.

However, the double moistureproof system requires approximately half of all cost of the EL panel and prevents the EL panel from being produced cheap and marketed extensively. Therefore, the AC powder type EL panel having improved moisture resistance at a reasonable price is demanded.

A conventional PF-LCD has a construction that a liquid crystal material such as a nematic liquid crystal is sandwiched between a pair of transparent electro-conductive films comprising polymer films such as PES having alignment films to orient liquid crystal on the side of transparent electrodes.

As mentioned above, PET is generally used for a polymer film for a transparent electro-conductive film of a AC powder type EL panel. Although PET has advantages such as higher transparency, solvent resistance, moisture impermeability and dimensional stability compared with other kinds of polymer films, it has a drawback that optical anisotropy is caused because it crystallizes by drawing. Therefore, an optic axis must be controlled to use PET as a base of a LCD. Accordingly the above PES having high heat resistance and optical characteristics is used for most of transparent electro-conductive films for a LCD base. On the contrary, PES has considerably lower moisture impermeability than PET shown in FIG. 8. FIG. 8 shows quantity of water penetrating through PET or PES film having a thickness of 10 $\mu$m measured under a high temperature and humidity condition of 80° C. and 90% according to JIS Z 0208.

Also it has been known that a liquid crystal material of a PF-LCD is degraded by moisture absorption not as much as a AC powder type EL panel. Despite considerably lower moisture impermeability compared with PET, PES is generally used, which demands to improve moisture impermeability of the transparent electro-conductive films.

The above conventional transparent electro-conductive films permit much moisture to penetrate through a polymer film as a base and there is a drawback that an organic AC powder type EL panel and a PF-LCD comprising the conventional transparent electro-conductive films readily are degraded by moisture.

OBJECT AND SUMMARY OF THE INVENTION

An object of the present invention is to considerably lower quantity of water (moisture permeability) penetrating through a polymer film as a base of a transparent electro-conductive film.

Another object of the present invention is to provide a cheaper AC powder type EL panel having longer life by using a transparent electro-conductive film remarkably improved in moisture permeability.

And a further object of the present invention is to provide a liquid crystal display having longer life by using transparent electro-conductive films remarkably improved in moisture permeability.

To achieve the above purposes, a transparent electro-conductive film of the present invention comprises an optical transparent polymer film including from 1 to 20% by weight hydrophobic resin particles having an average particle diameter of 0.5 to 10 μm therein and transparent electro-conductive thin film formed on at least one of principal surface of said polymer film.

And a AC powder type EL panel of the present invention comprises a back electrode on which a insulating layer is formed, a transparent electro-conductive film including an optical transparent polymer film containing 1 to 20% by weight of hydrophobic resin particles having an average particle diameter of 0.5 to 10 μm therein and a transparent electrode having a transparent electro-conductive thin film formed on the principal surface of said polymer film and being disposed opposite to the above back electrode, and an emitting layer sandwiched between the back electrode and the transparent electro-conductive film mentioned above.

Furthermore a liquid crystal display of the present invention comprises a pair of transparent electro-conductive films. The transparent electro-conductive film includes optical transparent polymer film respectively. The optical transparent polymer film contains 1 to 20% by weight of hydrophobic resin particles having an average particle diameter of 0.5 to 1.0 μm and transparent electrodes including transparent electro-conductive thin films having a certain pattern shape formed on one principal surface of each of said polymer films and being disposed opposite to each other to remain a certain space between said transparent electrodes, molecular alignment films formed on said transparent electrodes, and a liquid crystal material sandwiched between said pair of transparent electro-conductive films.

As a base material of the transparent electro-conductive film of the present invention, the polymer film includes 1 to 20% by weight of hydrophobic resin particles having an average particle diameter of 0.5 to 10 μm. Because of the shape and the content mentioned above, the above hydrophobic resin particles improve moisture permeability of the polymer film without any adverse effects on characteristics of the transparent electro-conductive film. Then because the AC powder type EL panel and the liquid crystal display of the present invention use the above transparent electro-conductive film whose moisture permeability is improved as a transparent electrode, required quantity of expensive outer film can be decreased, and low cost and long lifetime are achieved.

DETAILED DESCRIPTION OF PREFERRED EMBODIMENTS

The following is described to explain embodiments of the present invention with reference to the drawings.

Figure 1:
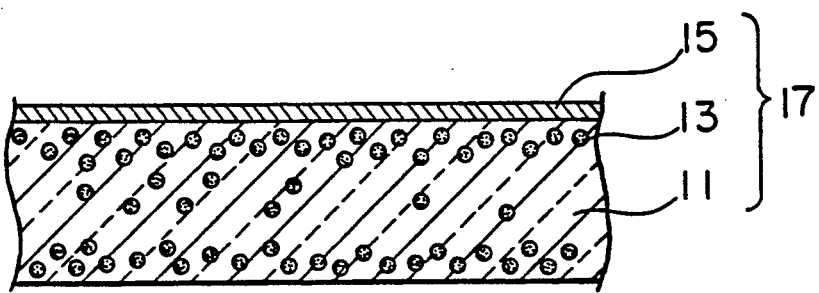
FIG. 1 is a sectional view showing a construction of the transparent electro-conductive film of one embodiment of this invention.

FIG. 1 shows a transparent electro-conductive film of one embodiment of the present invention. In FIG. 1, 11 is an optical transparent polymer film including hydrophobic resin particles 13. A transparent electro-conductive thin film 15 is formed on one of principal surfaces of the polymer film 11. The transparent electro-conductive film 17 is constructed with the polymer film 11 and the transparent electro-conductive thin film 15.

The above polymer film 11 is made of, for example, PET, PES, polyarylate, polycarbonate, polymethyl methacrylate, polystyrene, polysulfone or polyether etherketone. A material of the polymer film 11 is merely required to have transparency and flexibility and is not limited to the above materials.

The material is preferably selected to suit for uses of the polymer film 11. For example, besides PET, PES fits for the AC powder type EL panel. Likewise PES and polyarylate having less optical anisotropy and PET controlled its optical axis by drawing fit for PF-LCD. Thickness of the polymer film 11 is selected for uses and is usually 50 to 100 μm.

The above hydrophobic resin particles 13 are made of hydrophobic resin and have an average particle diameter of 0.5 to 10 μm. A material of them are not limited and are preferably infusible silicone resin particles.

The above infusible silicone resin particles are produced by granulating polyorganosiloxane having three-dimensional network with siloxane bonding. Organic radical bonding to silicon atoms of polyorganosiloxane is substituted or unsubstituted univalent hydrocarbon radical, aliphatic hydrocarbon radical such as methyl or ethyl, aromatic hydrocarbon radical such as phenylene, or unsaturated hydrocarbon radical having vinyl radical. Organic radical bonding to silicon atoms of polyorganosiloxsane often determines the hydrophobic property and the index of refraction of infusible silicone resin. The organic radical must be selected by considering the characteristic of the polymer film used. When PET is used as the polymer film, methyl or phenyl is suited as the organic radical. Silicone resin is available as silicone varnish prepared by dissolving an initial condensation polymer in an adequate solvent. But the above infusible silicone resin is powder having an average particle diameter of from 0.5 to 10 μm without any solvent and is completely thermosetted, substantially insoluble and infusible substance.

Hydrophobic resin powder used in the present invention has an average particle diameter of 0.5 to 10 μm and, preferably 1 to 5 μm. An average particle diameter of more transparency of the film. And it is difficult to prepare monodispersed particles having an average particle diameter of less than 0.5 μm. The hydrophobic resin particles are spherical and particularly sphericity f shown in the following formula (I) is desirably not less than 0.8.

$$f = \sqrt{A/(\pi/4)} \ /D\text{max} \qquad \text{(I)}$$

(wherein, A is a sectional area of the hydrophobic resin particle and D max is length of major axis of section of the hydrophobic resin particle). Sphericity f of the hydrophobic resin particles effects on particularly slipperiness and characteristics of a surface of the polymer film during preparation of the polymer film.

Quantity of the hydrophobic resin particles 13 being blended must be in the range from 1.0 to 20% by weight and preferably from 3 to 18% by weight based on the polymer film 11. When their content is not more than 1% by weight, improvement of permeability of the polymer film cannot be expected. And when their content is more than 20% by weight, surface flatness is lower and transparency of the film degrades.

Adding the hydrophobic resin particles 13 satisfying the above condition within the above range of content into the polymer film 11 increases density of distribution of the hydrophobic resin particles 13 near surfaces of the polymer film 11. Therefore, high barrier property against moisture appears. When the spherical infusible silicone resin particles are used as the hydrophobic resin particles 13 increases particularly near surfaces of the polymer film 11.

The transparent electro-conductive thin film 15 formed of the above polymer film 11 is, for example, a type of metal thin film such as Au, Pd, a type of metal oxide such as tin oxide, I.T.O., indium oxide, and a type of multiple layered thin film such as I.T.O./Pd. The thin film is required to have only transparency and conductivity and is not limited to the above materials.

The above transparent electro-conductive film 17 are prepared, for example, by the following method.

Primarily the hydrophobic resin particles 13 satisfying the above condition within the above range of content are added to and mixed will with a mixture of starting monomers forming the polymer film 11 or base polymers before condensation polymerization.

The mixture is usually condensation polymerized according to the polymer film 11 used and the polymer material including the hydrophobic resin particles is prepared.

The above polymer material is fused by heating to be formed into a film shape. If necessary, the formed film is drawn and the polymer film 11 having a certain thickness and containing the hydrophobic resin particles 13 is obtained.

The transparent electro-conductive thin film 15 is formed on one surface of the prepared polymer film 11 by physical depositing method of other well known methods and the transparent electro-conductive film 17 is obtained.

The above embodiment shows the transparent electro-conductive film 17 having the transparent electro-conductive thin film 15 formed on one side of the polymer film 11. The transparent electro-conductive thin films 15 may be formed on both sides of the polymer film 11.

The following shows a specific preparing example of the transparent electro-conductive film 17 having the above construction and the result of evaluation of the film.

Dimethyl terephthalate, ethylene glycol, manganese acetate as a catalyst for ester exchange reaction, antimony trioxide as a catalyst for polymerization and phosphorus acid as a stabilizer were mixed and polymerized according to usual polymerizing method, adding 10% by weight of the infusible silicone resin powder Tospearl 120 (the brand name, produced by Toshiba Silicone K.K.) having an average particle diameter of 2 $\mu$m and sphericity ranging from 0.87 to 0.93, and PET pellets having intrinsic viscosity of 0.60 to 0.65 are prepared.

Then the PET pellets were dried at 170 ° C. for 3 hours, supplied into a hopper of an extruder and melted at a melting temperature ranging from 280° to 300 ° C. And this molten polymer was extruded onto a turning drum cooler having surface roughness of approximately 0.3s and a surface temperature of 20 ° C., through a 0.1-mm wide slit to obtain a non-drawn film of 200 $\mu$m thick.

The above non-drawn film was preheated at 75 ° C., heated and the quenched, between low speed rolls and high speed rolls, supplied to a stenter and drawn with a lateral draw ratio of 3 at a temperature ranging from 100° to 110° C. The prepared biaxial drawn film was heat set up at a temperature ranging from 200° to 210 ° C. for five to ten seconds to obtain a heat set-up biaxial drawn PET film of 75 $\mu$m thick.

On the other hand, as Comparative Example, a heat set- up biaxial drawn PET film of 75 $\mu$m thick was prepared according to the aforementioned embodiment except for using the infusible silicone resin powder.

Then on one surface of each heat set-up biaxial drawn PET films mentioned above, an I.T.O. thin film was formed in thickness of 500 Å by an ion plating method to obtain the transparent electro-conductive films. The I.T.O. thin film had 300 $\Omega/\square$ of surface resistivity.

Quantity of water permeating through these transparent electro-conductive films of the above embodiment and Comparative Example were measured under a high temperature and humidity conditions of 80 ° C. and 90% according to JIS Z 0208. The results are shown in FIG. 2.

Figure 2:
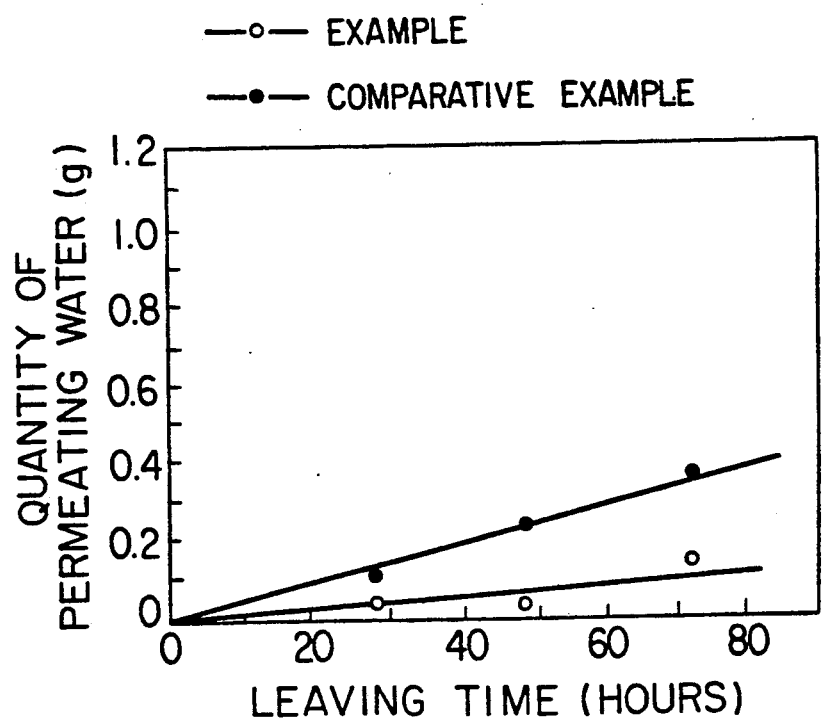
FIG. 2 is a graph showing quantity of water penetrating through the transparent electro-conductive film of one embodiment of this invention as compared with a conventional example.

FIG. 2 indicates that water permeability of the transparent electro-conductive film containing the infusible silicone resin particles of the embodiment is suppressed compared with the transparent electro-conductive film of Comparative Example not having the silicone resin particles.

Distribution of the silicone resin particles in a section of the transparent electro-conductive film of the embodiment was measured by a high resolution scanning secondary electron microscope with the result that density of distribution of the silicone resin particles increases near the surface of the Pet film, and the hydrophobic particles are considered to be a barrier against permeating water and to lower water permeability when arranged near the surface of the film.

Example of an EL panel of the present invention will be described in the following.

Figure 3:
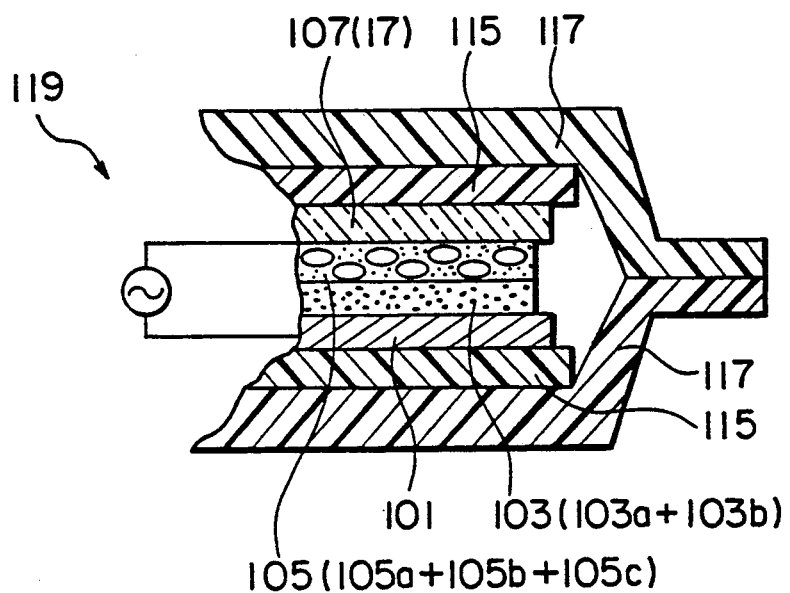
FIG. 3 is a typical sectional view showing a construction of the AC powder type EL panel of one embodiment of this invention.
Figure 4:
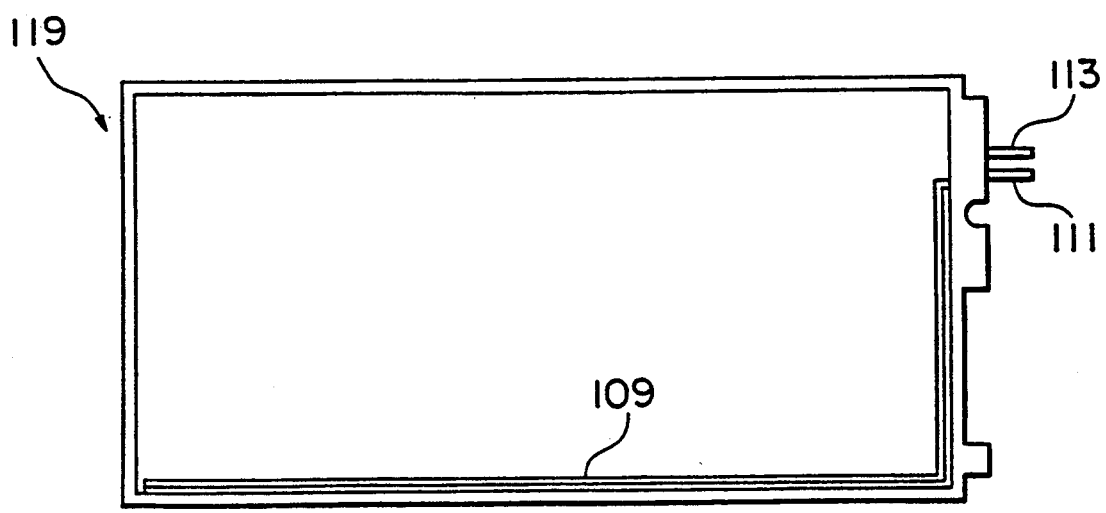
FIG. 4 is a top plan view showing the AC powder type EL panel shown in FIG. 3.

FIG. 3 and FIG. 4 show an embodiment of a AC powder type EL panel of the present invention.

In FIG. 3, 101 is a back electrode comprising aluminum foil on which an anodized aluminum is layered. Primarily a reflective insulating layer 103 having white inorganic dielectric particles 103b such as barium titnante dispersed in an organic dielectric binder 103a such as cyanoethyl pullulan or cyanoethyl-poval and secondarily an emitting layer 105 comprising similar organic dielectric binder 105a in which, for example, zinc sulfide phosphor particles 105b and organic fluorescent pigments 105c are AC powder type are layered on the back electrode 101 in due order.

On another surface of the above emitting layer 105, a transparent electro-conductive film 107 (17) comprising a polymer film (11), on which a transparent electrode (a transparent electro-conductive film 15) is formed and in which hydrophobic resin particles (13) such as infusible silicone resin particles are included, is layered so that the transparent electrode contacted with a surface of the above emitting layer. The polymer film (11) to be a base of the transparent electro-conductive film 107 is preferably, for example, PET or PES.

A bus-bar electrode 109 comprising a coating layer made of Ag paste was formed on the transparent electrode of the transparent electro-conductive film 107. Pulling electrodes 111 and 113 were installed at certain position on the bus-bar electrode 109 and the back electrode 101.

Desiccant films 115 comprising, for example, nylon 6 and moistureproof package films 117 comprising mainly, for example, trifluorochloroethylene are laminated on the outer surfaces of the above transparent electro-conductive film 107 and the back electrode 101 to construct a AC powder type EL panel 119.

Then using a transparent electro-conductive film 17 prepared in the above embodiment, a AC powder type EL panel having the above construction was prepared. A specific preparing embodiment and the results of evaluation of properties will be disclosed below.

Cyanoethyl-pullulan and cyanoethyl-poval were dissolved in N, N-dimethylformamide (hereinafter called DMF) to be a binder solution. And a paste for a insulating layer was prepared by dispersing barium titanate having an average particle diameter of 1 μm in the binder solution. The paste for a insulating layer was printed on a back plate 101 having aluminum foil formed on anodized aluminum layer, by screen printing and dried in a N₂ atmosphere at approximately 120° C. for 2 hours to remove DMF, resulting in forming a reflective insulating layer 103 of approximately 30 μm thick.

Paste for an emitting layer, prepared by dispersing zinc sulfide phosphor powder and organic fluorescent pigments in the same binder solution, was printed on the insulation layer 103 by screen printing and dried in a N₂ atmosphere at approximately 120° C. for 2 hours to remove DMF and an emitting layer 105 of approximately 30 μm thick was obtained.

On the other hand, an Ag paste was printed on a transparent electrode of a transparent electro-conductive film 107, including infusible silicone resin particles, by screen printing and a low-bar electrode 109 was formed by thermosetting. Pulling electrodes 111 and 113 were fixed temporarily with a PET tape on certain positions of the bus-bar electrode 109 and the back electrode 101.

After that, using a heat laminator, the transparent electrode of the transparent electro-conductive film 107 and the emitting layer 105 were laminated under the conditions of 150° to 170° C. of a roll surface temperature, 5 to 10 Kg/cm of linear pressure and 10 to 30 cm/min of roll speed.

The desiccant films 115 consisting of nylon 6 and the moistureproof package films 117 consisting of trifluorochloroethylene were laminated on the transparent electro-conductive film 107 by lamination in a combination shown in Table 1 to prepare a AC powder type EL panel.

Comparative Examples shown in Table 1 are AC powder type EL panels 119 prepared by the same as Examples using the transparent electro-conductive film prepared by the above comparative example instead of the transparent electro-conductive film of Example.

TABLE 1

| | | Transparent electro-conductive film | Thickness of desiccant film | Thickness of moisture-proof package film |
|---|---|---|---|---|
| Example | 1 | Silicone resin contained | 135 μm | 250 μm |
| | 2 | Silicone resin contained | 105 μm | 125 μm |
| Comparative | 1 | Silicone resin not contained | 135 μm | 250 μm |
| | 2 | Silicone resin not contained | 105 μm | 125 μm |

The AC powder type EL panels of Examples and Comparative Examples formed above were tested on life by impressing a voltage of 110 V and 500 Hz to be illuminated. The results are shown in FIG. 5 wherein the abscissa axis is indicated in logarithm.

Figure 5:
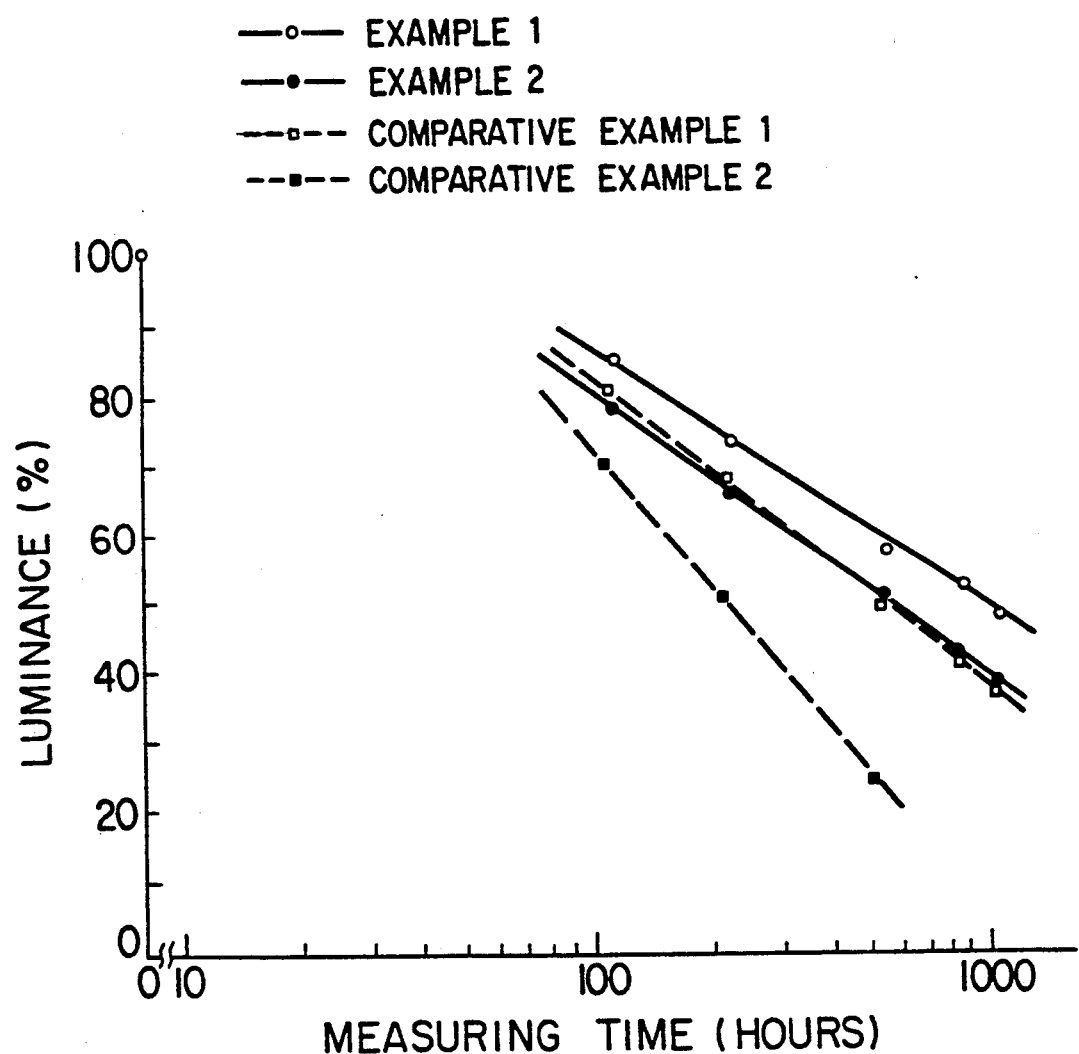
FIG. 5 is a graph showing lifetime characteristics of the AC powder type EL panels of one embodiment of this invention compared with conventional examples.

As FIG. 5 shows, water permeability of the transparent electro-conductive film 107 is obviously suppressed with the result that degradation by moisture absorption is suppressed and life of the film is longer. And the trifluorochloroethylene film (moistureproof film 117), which constitutes the highest percentage of the cost, having even half thickness of conventional film had similar life as conventional one and it was confirmed that the cost is able to be decreased.

Example of a liquid crystal display of the present invention will be described in the following.

Figure 6:
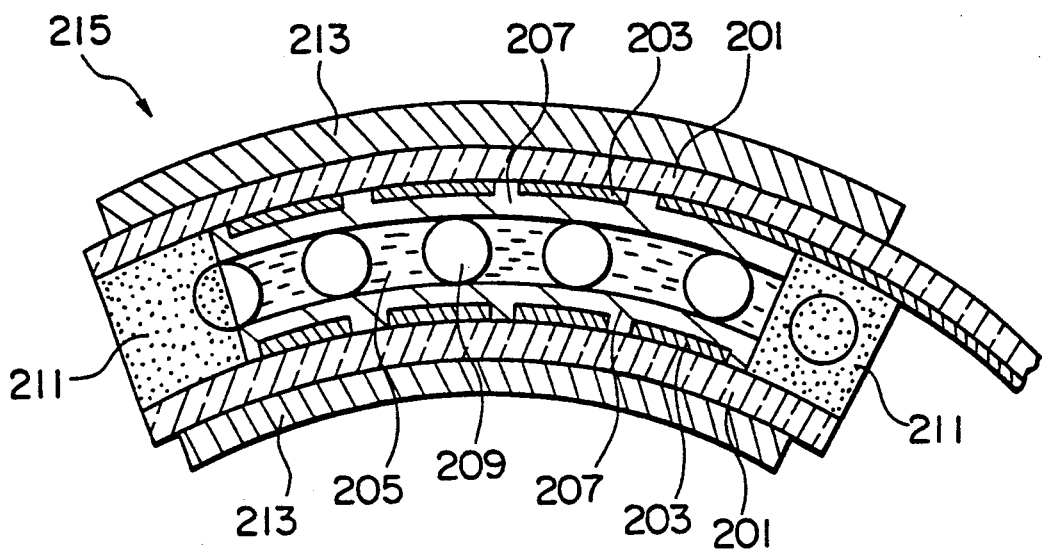
FIG. 6 is a sectional view showing a construction of the PF-LCD of one embodiment of this invention.

FIG. 6 shows Example of application of the present invention to PF-LCD.

In FIG. 6, 201 is transparent electro-conductive films formed of polymer films on which transparent electrodes 203 having certain pattern shape is formed and the above polymer films contain hydrophobic resin particles such as infusible silicone resin particles. The above polymer films are preferably PES or polyarylate which has less optical anisotropy, or PET [controlled]- whose optical axis is by uniaxial drawing. Molecular alignment films 207 are layered on the transparent electrodes 203 to orient a liquid crystal material 205.

For example, the liquid crystal material 205 consisting of nematic liquid crystal is sandwiched between a pair of transparent electro-conductive films 201 installed so that two transparent electrodes 203 set opposite to each other to remain a certain space.

To remain a certain space between the transparent electrodes 203 opposite to each other, for example, spherical gap fillings 209 having a diameter of 10 μm are laid between the transparent electro-conductive films 201. In addition to that, sealants 211 are filled up between the end of the transparent electro-conductive films 201 to encapsulate the liquid crystal material 205.

Deflecting plates 213 of, for example, 200 μm thick are placed on the outer surface of each transparent electro-conductive film 201 and as a whole a liquid crystal cell 215 is constituted.

Example of preparing a transparent electro-conductive film 201 for PF-LCD mentioned above will be described below.

2,7-Dihydroxynaphthalene, 4,4,-dichlorodiphenylsulfone, potassium carbonate, sulfolan and toluene were mixed, stirred, reacted at 160° C. for 1.5 hours. Then produced water was removed with toluene, and the mixture was further reacted at an increased temperature of 200° C. for 2 hours. After the reaction terminated, a product was dropped into water and a precipitated polymer was recovered. The polymer was ground, washed and dried at approximately 140° C. under reduced pressure. As blowing Ar gas, 12% by weight of infusible silicone resin powder Tospearl 120 (the brand name, produced by Toshiba Silicone K.K.) was added to the polymer and the mixture thereof was fused, stirred putted into a hopper of an extruder. The fusing polymer was extruded on a rolling drum cooler having a surface roughness of approximately 0.3s at a temperature of 20° C. through a slit having a width of 0.5 cm and a film having a thickness of 100 μm was obtained.

Using the transparent electro-conductive film including infusible silicone resin particles prepared by the above procedure, a PF-LCD panel having the above constitution was produced and evaluated on its properties in the following.

On the other hand, as Comparative Example, using a transparent electro-conductive film prepared by the same procedure as Example except for using infusible silicone resin particles, a PF-LCD having the same constitution was formed and evaluated on its properties.

Evaluation of properties was to confirm a reject rate of exterior appearance of each PF-LCD of Example and Comparative Example as the elapse of time under a high temperature and high humidity condition of 50° C. and 90% RH. The results are shown in FIG. 7 wherein the abscissa axis is indicated in logarithm.

Figure 7:
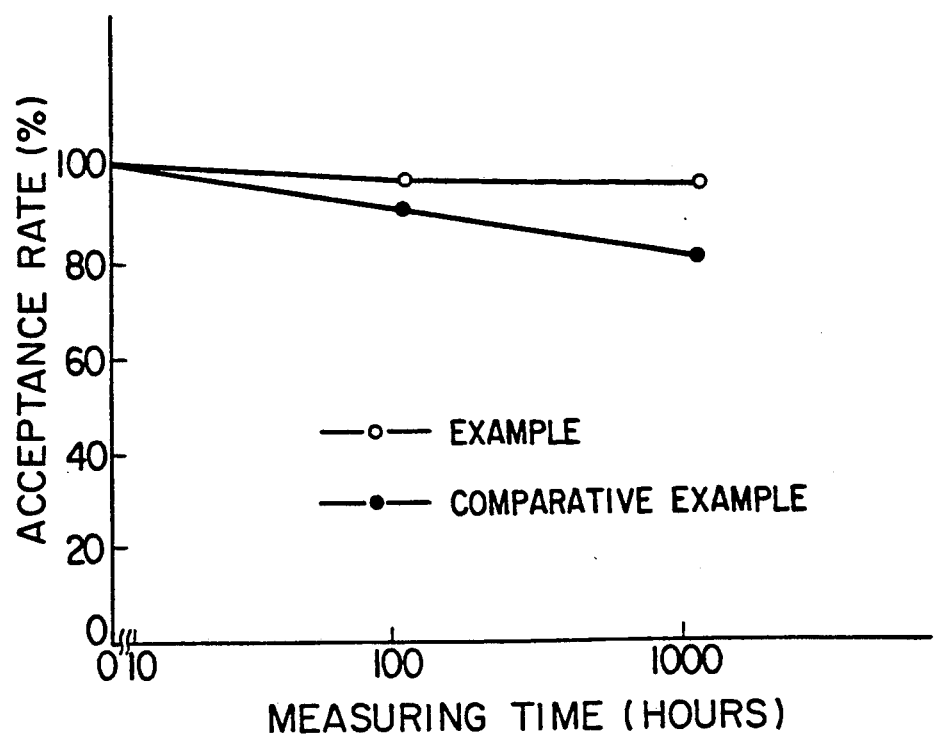
FIG. 7 is a graph showing the reject rate of exterior appearance of PF-LCD of one embodiment of this invention by a high temperature and humidity test compared with a conventional example.
Figure 8:
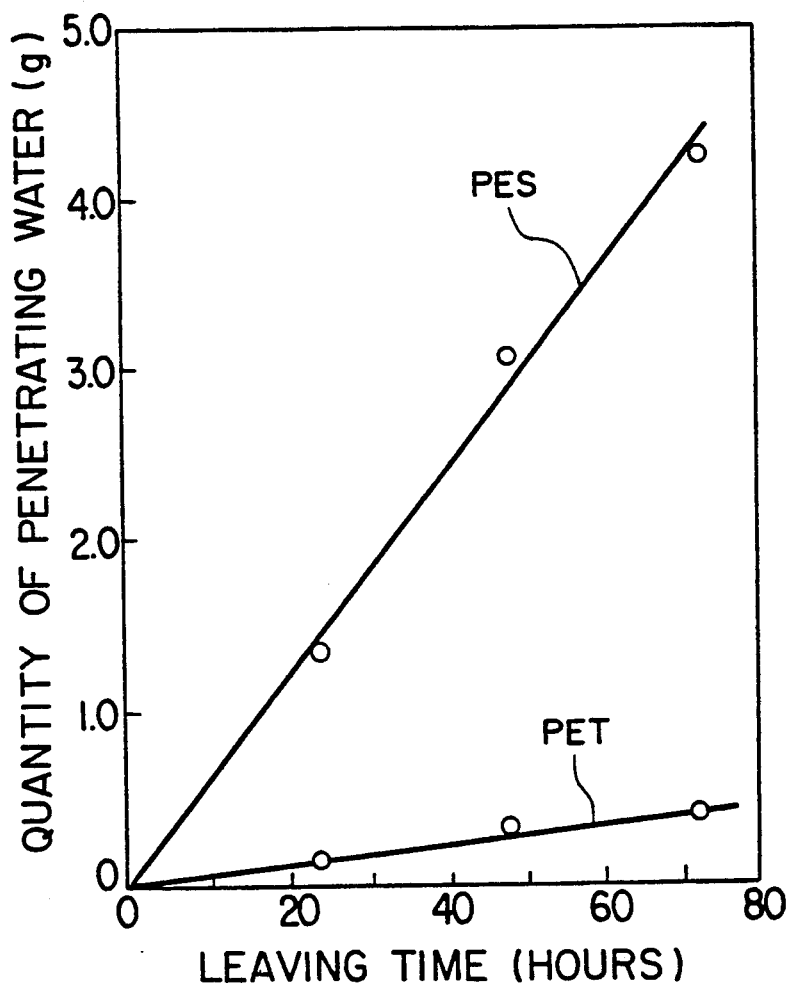
FIG. 8 is a graph showing quantity of water penetrating through conventional polymer films.

As FIG. 7 shows, water permeability of the transparent electro-conductive film 201 is suppressed with the result that degradation of the liquid crystal material 205 by moisture absorption is suppressed. Therefore, the liquid crystal display of the present invention has a reject rate of not more than 10% after a long use, for example, of 1000 hours compared with a reject rate of approximately 20% of the conventional one. Thus this Example confirmed longer life and improved durability.

What is claimed is:

1. A transparent electro-conductive film for an electrode of a display, comprising:

an optically transparent polymer film consisting essentially of at least one polymer selected from the group consisting of polyethylene terephthalate, polyether sulfone, polyacrylate, polycarbonate, polymethyl methacrylate. polystyrene, polysulfone and polyether etherketone, said polymer film containing from 3 to 18% by weight of hydrophobic resin particles having an average particle diameter of from 0.5 to 10 μm, and a transparent electro-conductive thin film formed on at least one principal surface of said polymer film.

2. The transparent electro-conductive film according to claim 1 wherein said hydrophobic resin particles are substantially infusible silicone resin particles.

3. The transparent electro-conductive film according to claim 1 wherein said hydrophobic resin particles are spherical.

4. The transparent electro-conductive film according to claim 3, wherein said hydrophobic resin particles satisfy the condition that sphericity f shown as the following formula (I) is 0.8 or more;

$$f = \sqrt{A/(\pi/4)} / D\text{max} \quad (I)$$

wherein A is a sectional area of the hydrophobic resin particles and Dmax is a length of major axis of section of the hydrophobic resin particles.

5. The transparent electro-conductive film according to claim 1 wherein said hydrophobic resin particles exist as concentrated to near surfaces of said polymer film.

6. The transparent electro-conductive film according to claim 1 wherein said polymer film has a thickness ranging from 50 to 100 μm.

7. The transparent electro-conductive film according to claim 1 wherein said transparent electro-conductive thin film substantially comprises at least one selected from of the group consisting of tin oxide, indium tin oxide, indium oxide, Au and Pd.

8. A liquid crystal display comprising;

a pair of transparent electro-conductive films including optical transparent polymer films containing 1 to 20% by weight of hydrophobic resin particles having an average particle diameter of 0.5 to 10 μm and transparent electrodes including transparent electro-conductive thin films having a certain pattern shape formed on one principal surface of each of said polymer films, being disposed opposite to each other to remain a certain space between them, molecular orientation films formed on said transparent electrodes, and a liquid crystal material sandwiched between said pair of transparent electro-conductive films.

9. The liquid crystal display according to claim 8 wherein said hydrophobic resin particles are substantially spherical infusible silicone resin particles.

10. The liquid crystal display according to claim 9, wherein said infusible silicone resin particles satisfy the condition that sphericity f shown in the following formula (I) is 0.8 or more $$f = \sqrt{A/(\pi/4)} / D\text{max} \quad (I)$$

wherein A is a sectional area of the hydrophobic resin particles and Dmax is a length of major axis of section of the hydrophobic resin particles.

11. The liquid crystal display according to claim 8 wherein said polymer films substantially comprise at least one selected from the group consisting of polyethersulfone, polyarylate and polyethylene terephthalate having its optical axis controlled by uniaxial orientation.

* * * * *

UNITED STATES PATENT AND TRADEMARK OFFICE
CERTIFICATE OF CORRECTION

PATENT NO. : 5,140,450

DATED : August 18, 1992

INVENTOR(S) : Masaru NIKAIDO, et al

It is certified that error appears in the above-identified patent and that said Letters Patent is hereby corrected as shown below:

Abstract, line 12, "Also, a AC powder type" should read
--Also, an AC powder type--.

Column 1, line 12, "and a AC powder" should read
--and an AC powder--.

Column 1, line 34, "a AC powder" should read
--an AC powder--.

Column 1, line 38, "a AC powder" should read
--an AC powder--.

Column 1, line 44, "A insulating layer" should read
--An insulating layer--.

Column 1, line 44, "dispersed a fine" should read
--dispersed as fine--.

Column 2, line 24, "a AC powder" should read
should read --an AC powder--.

Column 2, line 42, "a AC powder" should read
--an AC powder--.

Column 3, line 6, "a AC powder" should read
--an AC powder--.

Column 3, line 7, "which a insulating" should read
--which an insulating--.

UNITED STATES PATENT AND TRADEMARK OFFICE
CERTIFICATE OF CORRECTION

PATENT NO. : 5,140,450

DATED : August 18, 1992

INVENTOR(S) : Masaru NIKAIDO, et al

It is certified that error appears in the above-identified patent and that said Letters Patent is hereby corrected as shown below:

Column 4, line 59, "of more transparency of" should read
--of more than 10mm degrades surface flatness of the polymer film and transparency of--.

Column 5, line 35, "mixed will with" should read
--mixed well with--.

Column 6, line 3, "0.65 are prepared." should read
--0.65 were prepared.--.

Column 6, line 47, "of the Pet film," should read
--of the PET film,--.

Column 6, line 53, "of a AC powder" should read
--of an AC powder--.

Column 6, line 64, "105c are AC powder type are layered" should read --105c are dispersed are layered--.

Column 7, line 19, "construct a AC powder" should read
--construct an AC powder--.

Column 7, line 21, "embodiment, a AC powder" should read
--embodiment, an AC powder--.

Column 7, line 27, "for a insulating layer" should read
--for an insulating layer--.

Column 7, line 30, "for a insulating layer" should read
--for an insulating layer--.

UNITED STATES PATENT AND TRADEMARK OFFICE
CERTIFICATE OF CORRECTION

PATENT NO. : 5,140,450

DATED : August 18, 1992

INVENTOR(S) : Masaru NIKAIDO, et al

It is certified that error appears in the above-identified patent and that said Letters Patent is hereby corrected as shown below:

Column 7, line 62, "prepare a AC powder type" should read
--prepare an AC powder type--.

Column 7, line 63, "EL panel." should read
--EL panel 119.--.

Column 7, line 65, "EL panels 119 prepared" should read
--EL panels prepared--.

Signed and Sealed this

Fifteenth Day of November, 1994

Attest:

BRUCE LEHMAN

Attesting Officer     Commissioner of Patents and Trademarks